United States Patent
Guo et al.

(10) Patent No.: US 12,003,932 B2
(45) Date of Patent: Jun. 4, 2024

(54) SPEAKER SYSTEM FOR SLIM PROFILE DISPLAY DEVICES

(71) Applicant: Dell Products, L.P., Round Rock, TX (US)

(72) Inventors: Lei Guo, Singapore (SG); Beng Chong Goh, Sengkang (SG)

(73) Assignee: Dell Products, L.P., Round Rock, TX (US)

(*) Notice: Subject to any disclaimer, the term of this patent is extended or adjusted under 35 U.S.C. 154(b) by 173 days.

(21) Appl. No.: 17/650,293

(22) Filed: Feb. 8, 2022

(65) Prior Publication Data

US 2023/0254643 A1  Aug. 10, 2023

(51) Int. Cl.
*H04R 3/14* (2006.01)
*G06F 1/16* (2006.01)
*G06F 3/16* (2006.01)
*H04N 5/64* (2006.01)

(52) U.S. Cl.
CPC .............. *H04R 3/14* (2013.01); *G06F 1/1605* (2013.01); *G06F 3/165* (2013.01); *H04N 5/642* (2013.01); *H04R 2499/15* (2013.01)

(58) Field of Classification Search
CPC ..... H04R 3/14; H04R 2499/15; G06F 1/1605; G06F 3/165; H04N 5/642; H04S 3/002
USPC .......................................................... 381/99
See application file for complete search history.

(56) References Cited

U.S. PATENT DOCUMENTS

| | | | |
|---|---|---|---|
| 10,863,268 B1* | 12/2020 | Torigoe | G06F 1/1605 |
| 11,451,746 B1* | 9/2022 | Graybill | G06T 7/11 |
| 2005/0053242 A1* | 3/2005 | Henn | G10L 19/24 |
| | | | 381/23 |
| 2005/0271227 A1* | 12/2005 | Ikeuchi | H04R 5/02 |
| | | | 381/306 |
| 2007/0025559 A1* | 2/2007 | Mihelich | H04S 7/301 |
| | | | 381/59 |
| 2007/0077020 A1* | 4/2007 | Takahama | H04S 3/008 |
| | | | 386/339 |
| 2018/0077485 A1* | 3/2018 | Eichfeld | H04R 1/2803 |
| 2019/0028076 A1* | 1/2019 | Takahashi | H03G 3/3026 |

* cited by examiner

*Primary Examiner* — Carolyn R Edwards
*Assistant Examiner* — Friedrich Fahnert
(74) *Attorney, Agent, or Firm* — Fogarty LLP

(57) ABSTRACT

Systems and methods for selecting crossover frequencies for 2.1 speaker systems integrated into electronic displays are described. In an embodiment, an electronic display may include: a left speaker coupled to a left side of an enclosure, a right speaker coupled to a right side of the enclosure, and a subwoofer coupled to the left or right side of the enclosure. In another embodiment, a method may include: determining a position of an asymmetric subwoofer integrated into a display, and selecting a crossover frequency between the asymmetric subwoofer and a set of stereo speakers integrated into the display based, at least in part, upon the position.

19 Claims, 5 Drawing Sheets

SPEAKER SYSTEM FOR SLIM PROFILE DISPLAY DEVICES

FIELD

This disclosure relates generally to Information Handling Systems (IHSs), and, more specifically, to systems and methods for selecting crossover frequencies for 2.1 speaker systems integrated into electronic displays.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs can present visual information on different types of electronic displays, ranging from full-sized televisions to peripheral devices. In some cases, an IHS may employ standardized interfaces (e.g., High-Definition Multimedia Interface (HDMI), Universal Serial Bus (USB), Digital Visual Interface (DVI), Video Graphics Array (VGA), etc.) to render text, images, graphics, videos, etc. on a display. In the case of a portable IHS (e.g., a tablet, smart phone, etc.), the display may be integrated into the IHS's housing.

In recent years, electronic displays with built-in or integrated audio loudspeakers ("speakers") have become increasingly popular in the consumer market. At the same time, however, modern electronic displays have also adopted a slim profile (e.g., thickness) due to other design considerations.

As the inventors hereof have recognized, a speaker's performance is determined by a display's internal space. Particularly, a conventionally sized subwoofer would require a large enclosure to properly reproduce low-frequency audio. To address these, and other issues often associated with audio reproduction, especially by electronic displays having slim profiles, the inventors hereof have developed 2.1 speaker systems that provide a wide frequency response despite space limitations of a modern electronic display or IHS chassis.

SUMMARY

Systems and methods for selecting crossover frequencies for 2.1 speaker systems integrated into electronic displays usable by Information Handling System (IHSs) are described. In an illustrative, non-limiting embodiment, an electronic display may include: a left speaker coupled to a left side of an enclosure, a right speaker coupled to a right side of the enclosure, and a subwoofer coupled to the left or right side of the enclosure.

The left and right speakers may be configured to reproduce components of an audio signal having frequencies above a crossover frequency, and the subwoofer may be configured to reproduce components of the audio signal having frequencies below the crossover frequency.

The crossover frequency may be selected, at least in part, based upon a position of the subwoofer relative to a horizontal center axis of the enclosure. For example, the crossover frequency may be 200 Hz. Additionally, or alternatively, the crossover frequency may be increased in response to the subwoofer being positioned farther from the horizontal center axis and decreased in response to the subwoofer being positioned closer to the horizontal center axis.

Additionally, or alternatively, the crossover frequency may be selected, at least in part, to produce a balanced stereo output to a user. For example, the crossover frequency may be selected by the user. Additionally, or alternatively, the crossover frequency may be selected, at least in part, to produce an omni-directional output from the subwoofer as perceivable by a human user.

Additionally, or alternatively, the crossover frequency may be selected, at least in part, based upon an application executed by an IHS coupled to the electronic display. Additionally, or alternatively, the crossover frequency may be selected, at least in part, based upon context information collected by an IHS coupled to the electronic display. For example, the context information may include a presence or absence of a user, or a proximity of a user with respect to at least one of the IHS or the electronic display. Additionally, or alternatively, the crossover frequency may be increased in response to the user being farther from the at least one of the IHS or the electronic display and decreased in response to the user being closer to the at least one of the IHS or the electronic display.

In another illustrative, non-limiting embodiment, an IHS may include: an enclosure; a left speaker coupled to a left side of the enclosure, a right speaker coupled to a right side of the enclosure, and a subwoofer coupled to the left or right side of the enclosure, where the left and right speakers are configured to receive audio components consisting of frequencies above a crossover frequency and the subwoofer is configured to receive audio components consisting of frequencies below the crossover frequency; a processor coupled to the enclosure; and a memory coupled to the processor, the memory having program instructions stored thereon that, upon execution by the processor, cause the IHS to select the crossover frequency to produce a balanced stereo output to a user.

The program instructions, upon execution, may also cause the IHS to select the crossover frequency based upon an application executed by the IHS. The program instructions may further cause the IHS to select the crossover frequency based upon context information. For example, the context information may include a presence of a user, or a proximity of a user.

In yet another illustrative, non-limiting embodiment, a method, may include determining a position of an asymmetric subwoofer integrated into a display and selecting a crossover frequency between the asymmetric subwoofer and a set of stereo speakers integrated into the display based, at least in part, upon the position. The selected crossover frequency may produce an omni-directional output from the asymmetric subwoofer with respect to a human user. Additionally, or alternatively, the selected crossover frequency may have a first value in response to the asymmetric subwoofer being positioned at a first distance from a center of the display, and a second value in response to the asymmetric subwoofer being positioned at a second distance from the center of the display.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

Figure 2:
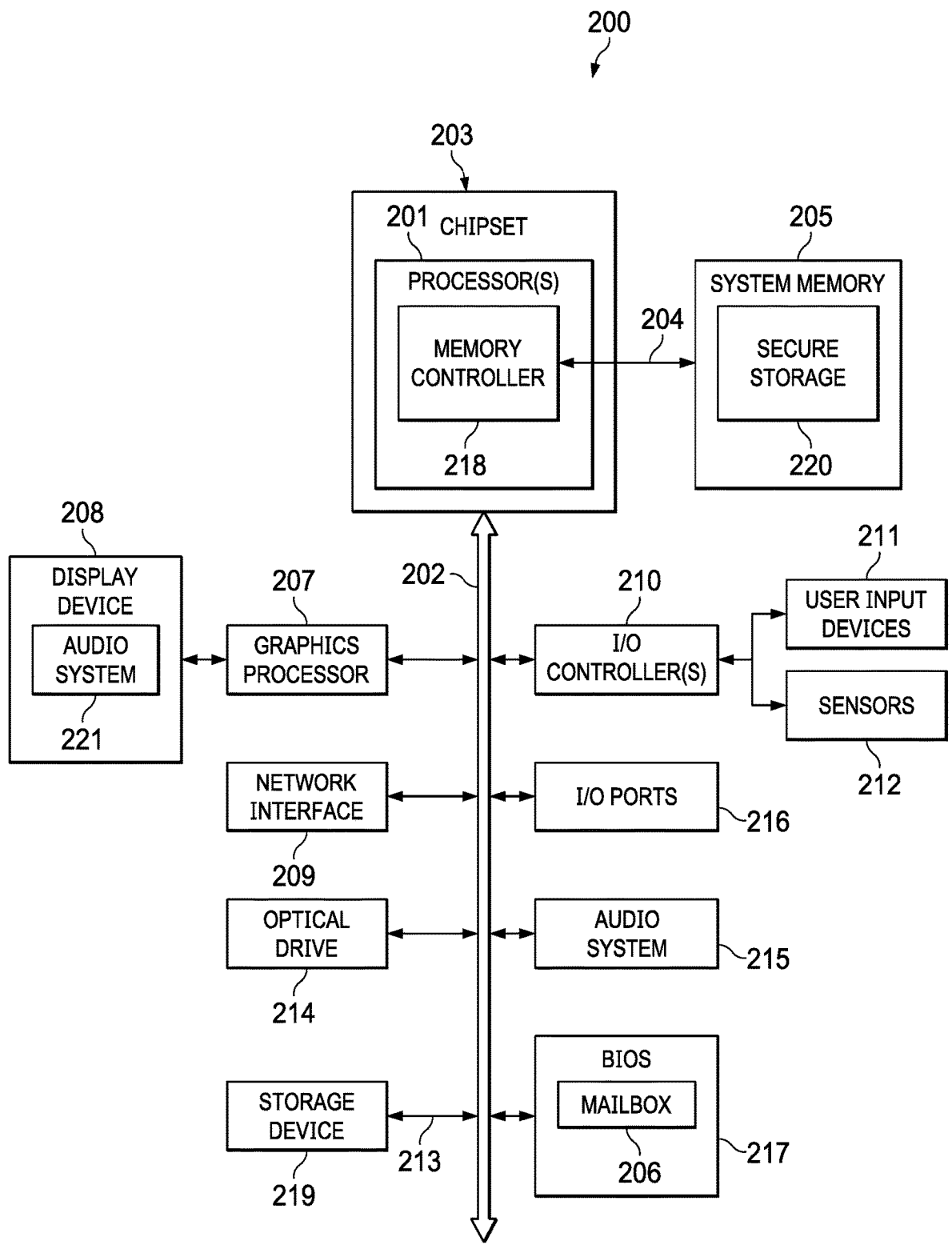
FIG. 2 is a diagram of examples of components of an Information Handling System (IHS), according to various embodiments.

An example of an IHS is described in more detail below. Particularly, FIG. 2 shows various internal components of an IHS configured to implement certain embodiments. It should be appreciated, however, that although certain embodiments described herein may be discussed in the context of a personal computing device, other embodiments may utilize various other types of IHSs.

Figure 1:
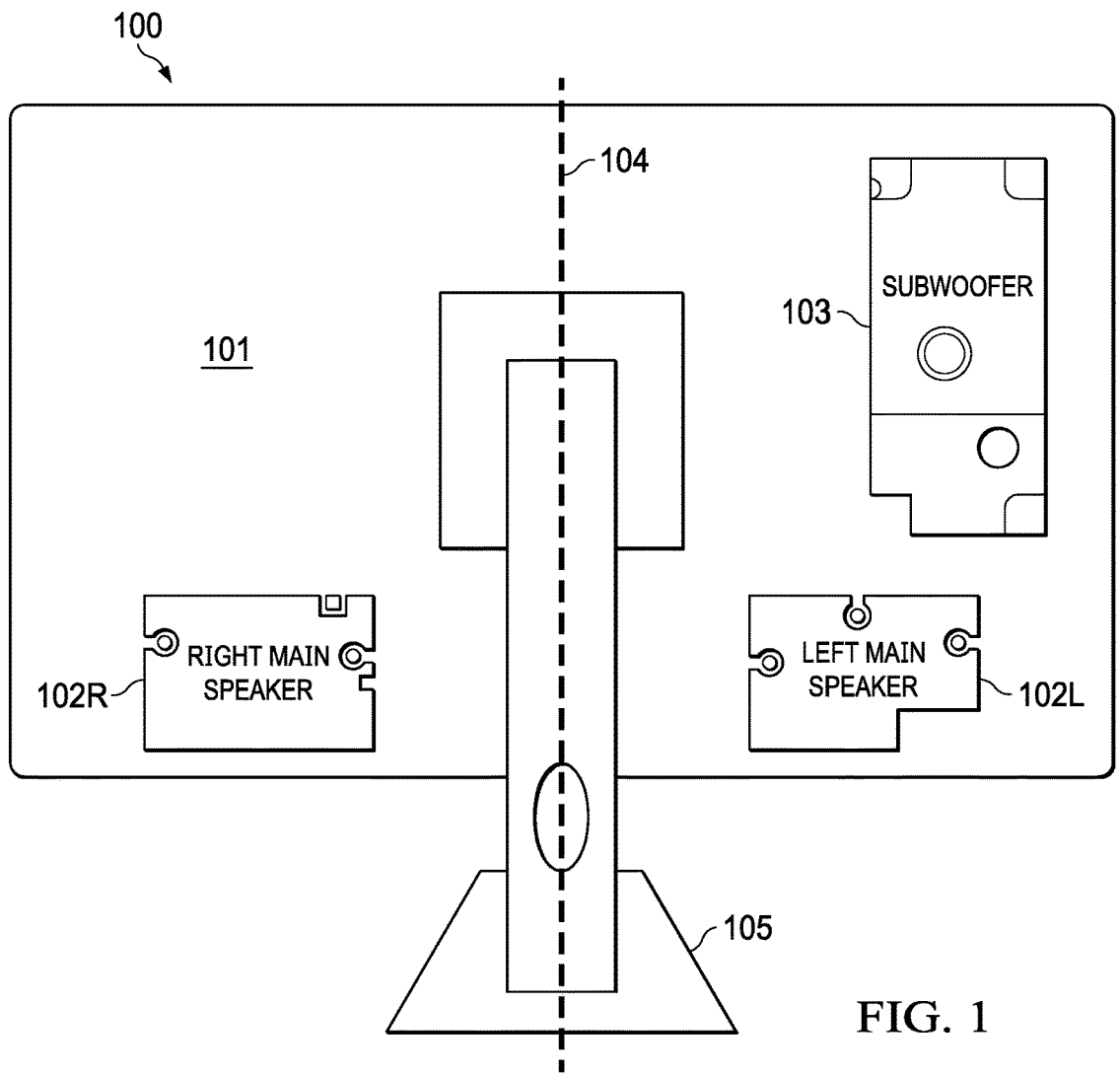
FIG. 1 is a diagram of an example of a 2.1 speaker system integrated into an electronic display, according to various embodiments.

FIG. 1 is a diagram of an example of a 2.1 speaker system integrated into electronic display 100. Particularly, display 100 is housed within enclosure 101. The rear of enclosure 101 includes right speaker 102R, left speaker 102L, and unilateral, asymmetric subwoofer 103 mounted thereto (i.e., a "pseudo-2.1" speaker system). Enclosure 101 is held up vertically by stand or arm 105 positioned along a horizontal center axis 104.

Figure 5:
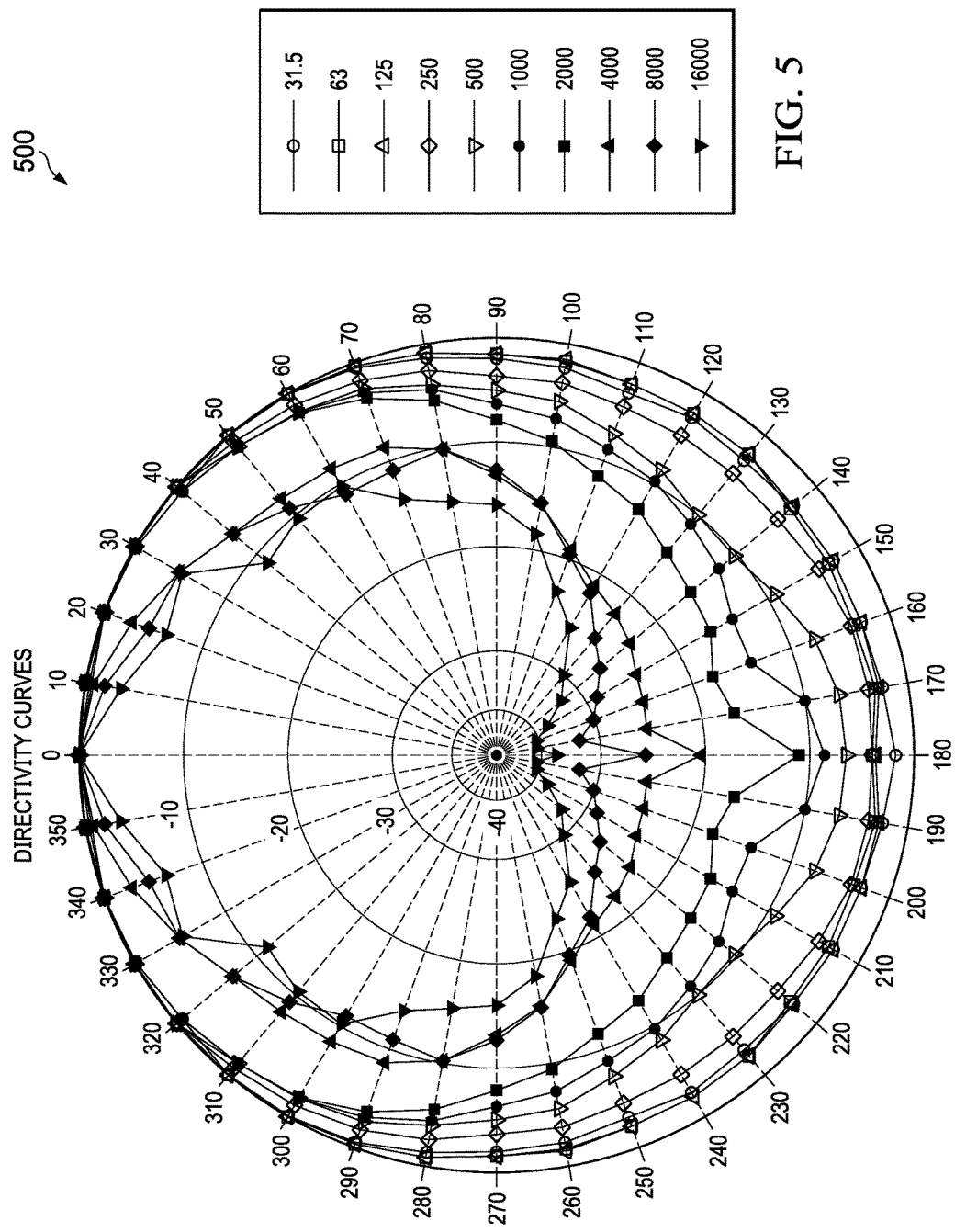
FIG. 5 is a diagram of examples of directivity curves, according to various embodiments.

In a conventional 2.1 speaker system configuration, two stereo speakers would be used to reproduce audio signals (e.g., containing music, sound effects, movies, audio recordings, audiobooks, podcasts, conference calls, etc.) with frequencies of 500 Hz and above, and a subwoofer would reproduce audio signals with frequencies of 500 Hz and below. As the inventors hereof have recognized, however, at 500 Hz a subwoofer presents significant directionality, as shown in FIG. 5. To preserve stereo balance, the subwoofer would have to be integrated right in the middle of enclosure 101, along horizontal center axis 104, which is often not possible due to the presence of stand or arm 105.

To address these, and other concerns, system and methods described herein may use the frequency at which a subwoofer becomes omni-directional (to a human listener) as the crossover point, thus addressing left-right audio channel unbalancing volume mismatch. As used herein, the term "crossover frequency" generally refers to the audio frequency at which sound transitions from one speaker to another.

For example, systems and methods described herein may use digital circuitry (FIG. 3) and/or an analog crossover network (FIG. 4) configured to cause left and right main speakers 102L-R to reproduce audio with frequencies of approximately 200 Hz and above, and to cause subwoofer 103 to reproduce audio with frequencies below approximately 200 Hz. Additionally, or alternatively, the crossover frequency may be between 190 Hz and 210 Hz. Additionally, or alternatively, the crossover frequency may be between 175 Hz and 225 Hz. Additionally, or alternatively, the crossover frequency may be between 200 Hz and 250 Hz. Additionally, or alternatively, the crossover frequency may be between 150 Hz and 200 Hz.

In some embodiments, the crossover frequency may be selected based upon a position of subwoofer 103 with respect to horizontal center axis 104. Additionally, or alternatively, the crossover frequency may be selected or modified based upon a type of application (e.g., a media player, a conferencing application, a sound recording application, etc.) being executed by an IHS coupled to display 100. Additionally, or alternatively, the crossover frequency may be selected (or modified) during operation of the IHS based upon context information (e.g., type of audio content, user presence, user proximity, etc.).

FIG. 2 is a diagram depicting components of an example IHS 200. In some embodiments, IHS 200 includes one or more processor(s) 201, such as a Central Processing Unit (CPU), operable to execute code retrieved from system memory 205. Although IHS 200 is illustrated with a single processor, other embodiments may include two or more processors, that may each be configured identically, or to provide specialized processing operations.

Processor(s) 201 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA. In the embodiment of FIG. 2, processor(s) 201 includes an integrated memory controller 218 implemented directly within the circuitry of processor(s) 201. In other implementations, memory controller 218 may be a separate integrated circuit located on the same die as processor(s) 201. Memory controller 218 may be configured to manage the transfer of data to and from system memory 205 of IHS 200 via high-speed memory interface 204.

System memory 205 is coupled to processor(s) 201 via memory bus 204 and provides processor(s) 201 with a high-speed memory that may be used in the execution of computer program instructions by processor(s) 201. Accordingly, system memory 205 may include memory components, such as such as static RAM (SRAM), dynamic RAM (DRAM), NAND Flash memory, suitable for supporting high-speed memory operations by processor(s) 201. In some embodiments, system memory 205 may combine both persistent, non-volatile memory and volatile memory.

IHS 200 utilizes chipset 203 (e.g., a Platform Controller Hub or "PCH," a Fusion Controller Hub or "FCH," etc.) having one or more integrated circuits coupled to processor(s) 201. In the embodiment of FIG. 2, processor(s) 201 is depicted as a component of chipset 203. In other embodiments, all of chipset 203, or portions of chipset 203 may be implemented directly within the integrated circuitry of processor(s) 201. Chipset 203 provides processor(s) 201 with access to a variety of resources accessible via bus 202. In IHS 200, bus 202 is illustrated as a single element. However, other implementations may utilize any number of buses to provide the illustrated pathways served by bus 202.

As illustrated, a variety of resources may be coupled to processor(s) 201 of IHS 200 through chipset 203. For instance, chipset 203 may be coupled to network interface 209, such as provided by a Network Interface Controller (NIC) that is coupled to IHS 200 and allows IHS 200 to communicate via a network, such as the Internet or a LAN. Network interface device 209 may provide IHS 200 with wired and/or wireless network connections via a variety of network technologies, such as wireless cellular or mobile networks (e.g., code-division multiple access "CDMA," time-division multiple access or "TDMA," Long-Term Evolution or "LTE," etc.), WiFi, BLUETOOTH, etc.

Chipset 203 may also provide access to one or more display device(s) 208 via graphics processor 207 and/or I/O ports 216. In some implementations, one or more display device(s) 208 may be implemented as electronic display 100 of FIG. 1, equipped with a 2.1 speaker system configured to reproduce audio signals. In certain embodiments, audio system 215 may receive audio information from processor(s) 201 and it may present the audio information as audible sound, for example, as reproduced by speakers 102R-L and/or 103 in display 100. Additionally, or alternatively, audio system 221 may be provided within display device(s) 208.

Graphics processor 207 may be included within one or more video or graphics cards or an embedded controller installed as components of IHS 200. Graphics processor 207 may generate display information and provide the generated information to one or more display device(s) 208, where display device(s) 208 may include integrated display devices and/or external display devices coupled to IHS, such as via an I/O port 216. In certain embodiments, graphics processor 207 may be integrated within processor 201.

Display device(s) 208 may utilize Liquid Crystal Display (LCD), Light Emitting Diode (LED), organic LED (OLED), or other thin film display technologies. Each of display device(s) 208 may be capable of touch input such as via a touch controller which may be embedded in display device(s) 208, graphics processor 207, or it may be a separate component of IHS 200 accessed via bus 202.

In certain embodiments, chipset 203 may utilize one or more I/O controller(s) 210 to access hardware components such as user input devices 211 and sensors 212. For instance, I/O controller(s) 210 may provide access to user-input devices 210 such as a keyboard, mouse, touchpad, touchscreen and/or other peripheral input devices. User input devices 211 may interface with I/O controller(s) 210 through wired or wireless connections. Sensors 212 accessed via I/O controller(s) 210 may provide access to data describing environmental and operating conditions of IHS 200 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.).

In some cases, chipset 203 may include a sensor hub capable of utilizing information collected by sensors 212. For instance, the sensor hub may utilize inertial movement sensors (e.g., accelerometer, gyroscope, magnetometer sensors, etc.) capable of determining the orientation and movement of IHS 200 (e.g., IHS 200 is motionless on a relatively flat surface, IHS 200 is being moved irregularly and is likely in transport, the hinge of IHS 200 is oriented in a vertical direction).

In certain embodiments, the sensor hub may also include capabilities for triangulation of network signal and based on network information provided by the OS or network interface 209. In some embodiments, the sensor hub may support additional sensors, such as optical, infrared and sonar sensors, that may provide support for xR (virtual, augmented, and/or mixed reality) sessions hosted by the IHS 200 and may be used to provide an indication of a user's presence near IHS 200, such as whether a user is present, absent, or facing display device(s) 208.

In cases where the end-user is present before IHS 200, the sensor hub may further determine a distance between the end-user and the IHS, where this determination may be made continuously, at periodic intervals, or upon request. The detected or calculated distances may be used by processor 201 to classify the user as being in the IHS's near-field (user's position<threshold distance A), mid-field (threshold distance A<user's position<threshold distance B, where B>A), or far-field (user's position>threshold distance C, where C>B).

In embodiments where IHS 200 may support multiple physical configurations, such as a convertible laptop, N-in-1 device, or the like, the sensor hub may utilize one or more mode sensors 212 that collect readings that may be used in determining the posture in which IHS 200 is physically configured. In certain embodiments, such posture determinations may be additionally made using the movement and orientation information provided by sensors 212.

In laptop and convertible laptop embodiments, for example, processor 201 may utilize a lid position sensor 212 to determine the relative angle between the two panels of the laptop to determine the mode in which IHS 200 is physically configured. In such embodiments, the lid position sensor may measure the angle of rotation of the hinge that connects the base panel and lid panel of IHS 200. In some embodiments, processor 201 may provide collected lid position information, such as the hinge angle, to the sensor hub for use in determining the posture in which IHS 200 is configured. In some embodiments, the sensor hub may interface directly with the lid position sensor in determining hinge angle information.

Other components of IHS 200 may include one or more I/O ports 216 for communicating with peripheral external devices as well as various input and output devices. For instance, I/O 216 ports may include HDMI ports for use in connecting external display devices to IHS 200 and USB ports, by which a variety of external devices may be coupled to IHS 200. In some embodiments, external devices coupled to IHS 200 via I/O port 216 may include storage devices that support transfer of data to and from system memory 205 and/or storage devices 219.

Chipset 203 also provides processor(s) 201 with access to one or more storage devices 219. In various embodiments, storage device 219 may be integral to IHS 200, or may be external to IHS 200. In certain embodiments, storage device 219 may be accessed via a storage controller that may be integrated therein. Storage device 219 may be implemented using any memory technology allowing IHS 200 to store and retrieve data. For instance, storage device 219 may be a magnetic hard disk storage drive or a solid-state storage drive. In some embodiments, storage device 219 may be a system of storage devices, such as a cloud drive accessible via network interface 209.

As illustrated, IHS 200 also includes BIOS (Basic Input/Output System) 217 that may be stored in a non-volatile memory accessible by chipset 203 via bus 202. Upon powering or restarting IHS 200, processor(s) 201 may utilize BIOS 217 instructions to initialize and test hardware components coupled to IHS 200. BIOS 217 instructions may also load an OS for use by IHS 200. BIOS 217 provides an abstraction layer that allows the OS to interface with the hardware components of IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiment, BIOS 217 includes a predefined memory or memory region that may be referred to as Non-Volatile Memory (NVM) mailbox 206. NVM mailbox 206 may provide a secured storage location for use in storing access policies, signatures, cryptographic keys or other secure data.

In operation, IHS 200 may support the use of various power modes. In some embodiments, the power modes of IHS 200 may be implemented through operations of a trusted or Embedded Controller coupled to processor(s) 101 and/or the OS of IHS 200. In various embodiments, IHS 200 may support various reduced power modes to reduce power consumption and/or conserve battery power when IHS 200 is not actively in use, and/or to control a level of performance available to the user by increasing or decreasing a maximum operating clock frequency of a component of IHS 200 (e.g., processor(s) 201).

In some embodiments, an IHS 200 may not include all the components shown in FIG. 2. In other embodiments, an IHS 200 may include other components in addition to those that are shown in FIG. 2. Furthermore, some components that are represented as separate components in FIG. 2 may instead be integrated with other components. For example, in certain embodiments, all or a portion of the operations executed by the illustrated components may instead be provided by components integrated into processor(s) 201 as a System-on-Chip.

Figure 3:
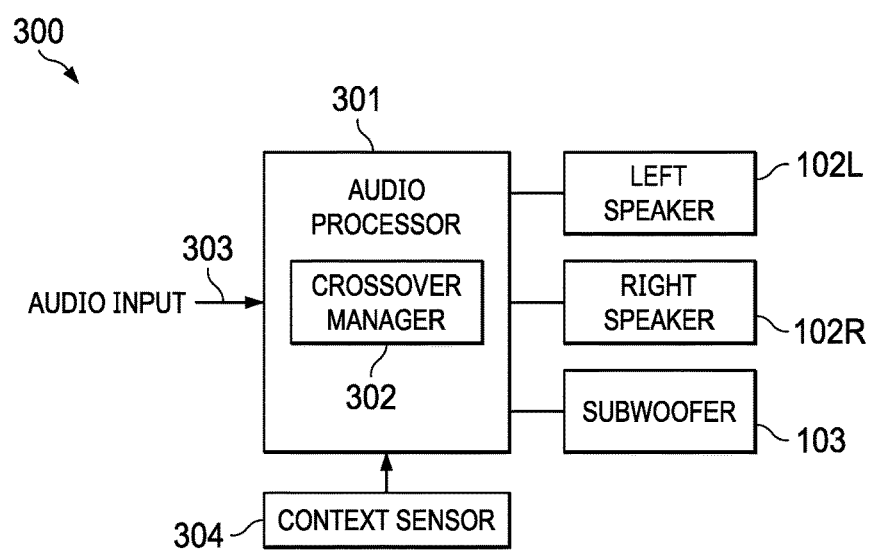
FIG. 3 is a diagram of an example of audio system components, according to various embodiments.

FIG. 3 is a diagram of an example of components of audio system 215 and/or 221. Particularly, audio system 215 and/or 221 includes audio processor 301 coupled to left speaker 102L, right speaker 102R, and/or subwoofer 103. In some cases, amplifiers and/or digital-to-analog (DAC) converters may be built into, or coupled to, audio processor 301.

Audio processor 301 includes crossover manager 302, comprising circuitry configured to select or modify a crossover frequency between stereo speakers 102L-R and subwoofer 103, as described herein. In some cases, 302 may include active crossover circuitry. Audio processor 301 may also apply equalization to signals provided to left speaker 102L, right speaker 102R, and/or subwoofer 103.

In operation, audio processor 301 receives audio information from processor(s) 101 and presents the audio information as audible sounds through left speaker 102L, right speaker 102R, and/or subwoofer 103. In some cases, audio may be synchronized with visual information when presenting audiovisual files, such as movies or video conferences. In other cases, audio may be presented independent of visual information, such as music recordings and telephone conversations.

In some applications, audio information may have a monoaural configuration, such that a single audio channel outputs the same audio signal at each speakers 102L-R. In other applications, audio information may have a stereo configuration. For example, two-channel stereo provides left and right audio signals for presentation at left and right locations relative to a listener positioned in front of display 100. In yet other instances audio information may have a 2.1 configuration such that the same two-channel stereo provides left and right audio signals with mid and high-frequency content, and an additional channel provides low-frequency content.

Crossover manager 302 may receive audio input 303 and/or contextual data from sensors 304 (e.g., data indicative of a type of application being executed by IHS 200, data indicative of IHS posture, user presence and/or proximity data from sensors 212, etc.), and it may select or modify the crossover frequency between stereo speakers 102L-R and subwoofer 103. Particularly, audio processor 301 may apply one or more digital filters (e.g., high-pass, band-pass, and/or low-pass filters) to audio input 303 to select the spectral content of signals transmitted to left speaker 102L, right speaker 102R, and/or subwoofer 103.

In some implementations, the crossover frequency may be selected by a user of IHS 200. Additionally, or alternatively, the crossover frequency may be selected to produce an omni-directional output from the subwoofer as perceivable by a human user. During design or manufacturing of display 100, the crossover frequency may be increased in response to subwoofer 103 being mounted onto enclosure 101 farther from the horizontal center axis 104 and decreased in response to subwoofer 103 being positioned closer to horizontal center axis 104 (that is, in a "pseudo-2.1" or asymmetric 2.1 configuration).

In some cases, crossover manager 302 may further select or modify the crossover frequency dynamically based upon an application executed by IHS 200 coupled to electronic display 100. Additionally, or alternatively, the crossover frequency maybe selected based upon context information collected by an IHS coupled to the electronic display, such as a presence or absence of a user, and/or based upon a proximity of a user with respect to at least one of the IHS or the electronic display. For example, crossover manager 302 may be configured to increase the crossover in response to the user being farther from IHS 200 and/or electronic display 100, and it may be configured to decrease the crossover frequency in response to the user being closer to IHS 200 and/or electronic display 100.

Figure 4:
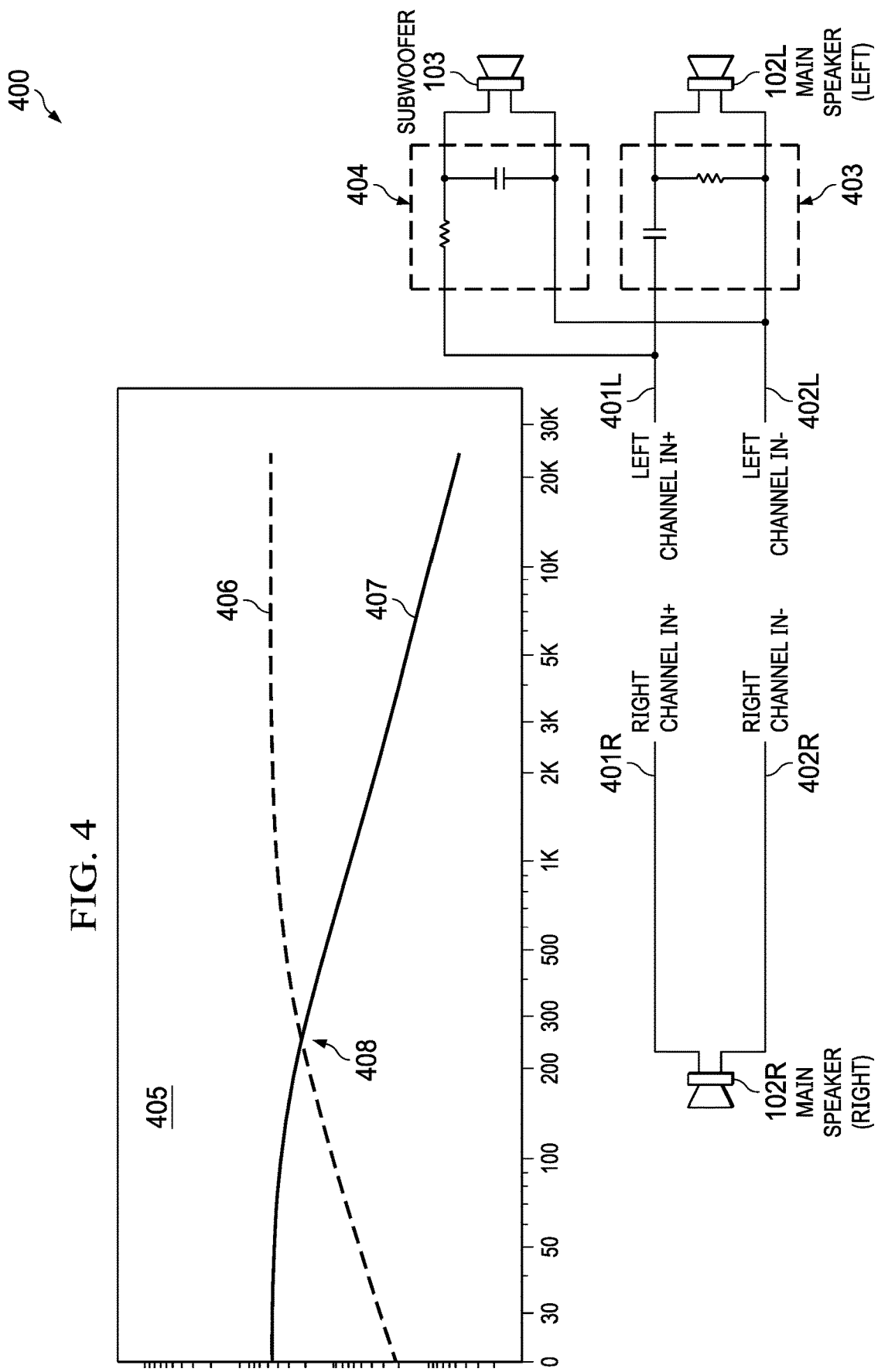
FIG. 4 is a diagram of an example of a passive crossover network and associated frequency response, according to various embodiments.

FIG. 4 is a diagram of an example of a passive crossover network 400 and associated frequency response 405. In some embodiments, passive crossover network 400 may be integrated into electronic display 100 and/or IHS 200. For example, passive crossover network 400 may be used instead of (or in addition to) audio system 215 to select a crossover frequency between speakers 102L-R and subwoofer 103.

Particularly, passive crossover network 400 may include high-pass (or band-pass) filter 403 coupled to left/right channels 401L-R and 402L-R of left/right speakers 102L-R, and low-pass (or band-pass) filter 404 coupled to subwoofer 103. Components in each of filters 403 and 404 (e.g., capacitors, resistors, operational amplifiers, etc.) may be selected and/or sized to provide a desired crossover frequency (e.g., 200 Hz).

Frequency response graph 405 shows first frequency curve/content 406 of an audio signal output by left/right speakers 102L-R, and second frequency curve/content 407 of an audio signal output by subwoofer 103. In operation, passive crossover network 400 may effectively allocate audio content with frequencies above crossover frequency 408 to left/right speakers 102L-R, and it may effectively allocate audio content with frequencies below crossover frequency 408 to subwoofer 103, in a manner that produces a balanced stereo audio output despite an off-center position of subwoofer 103 with respect to horizontal center axis 104 of enclosure 101.

FIG. 5 is a diagram of examples of directivity curves 500. With respect to a human user located in front of display 100, it may be noted that sound with frequencies of 250 Hz and above present significant directionality, whereas sound with frequencies of 250 Hz and below are (near) omni-directional.

Figure 6A:
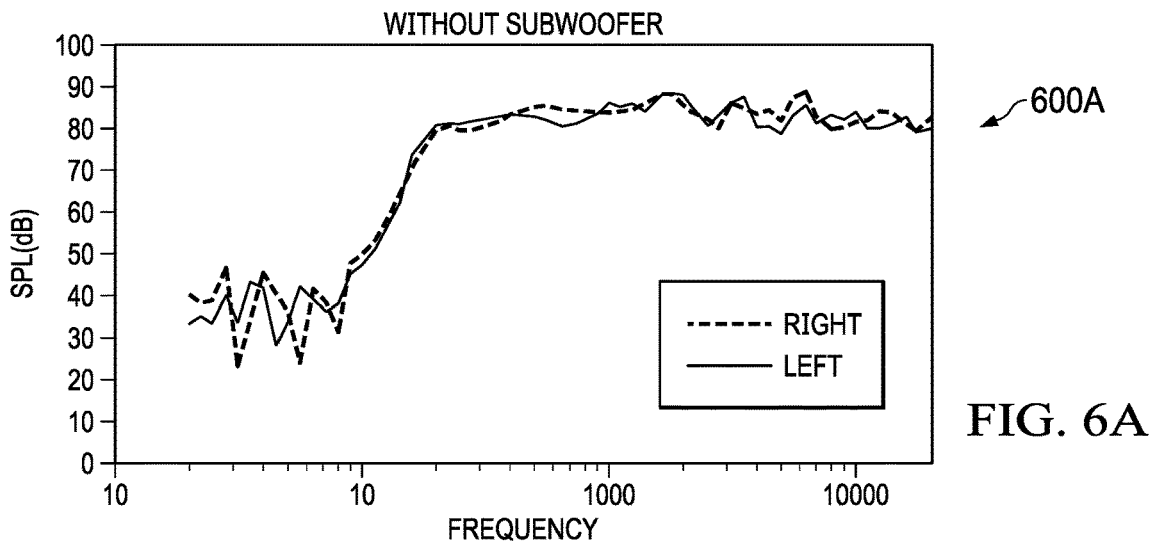
FIGS. 6A-C are graphs illustrating an example application of systems and methods for selecting crossover frequencies for 2.1 speaker systems integrated into electronic displays having a slim profile, according to various embodiments.
Figure 6B:
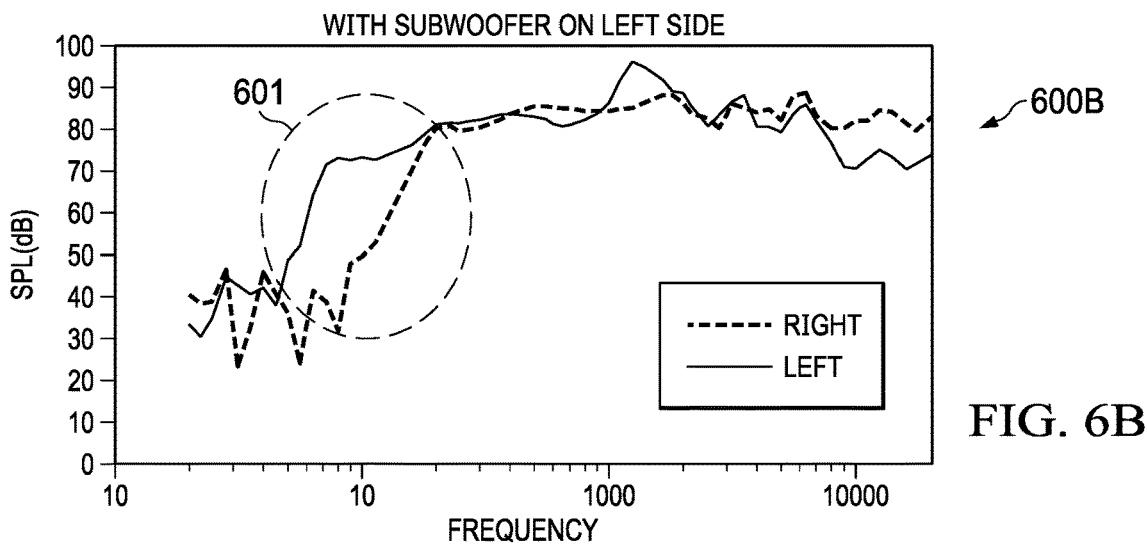
Figure 6C:
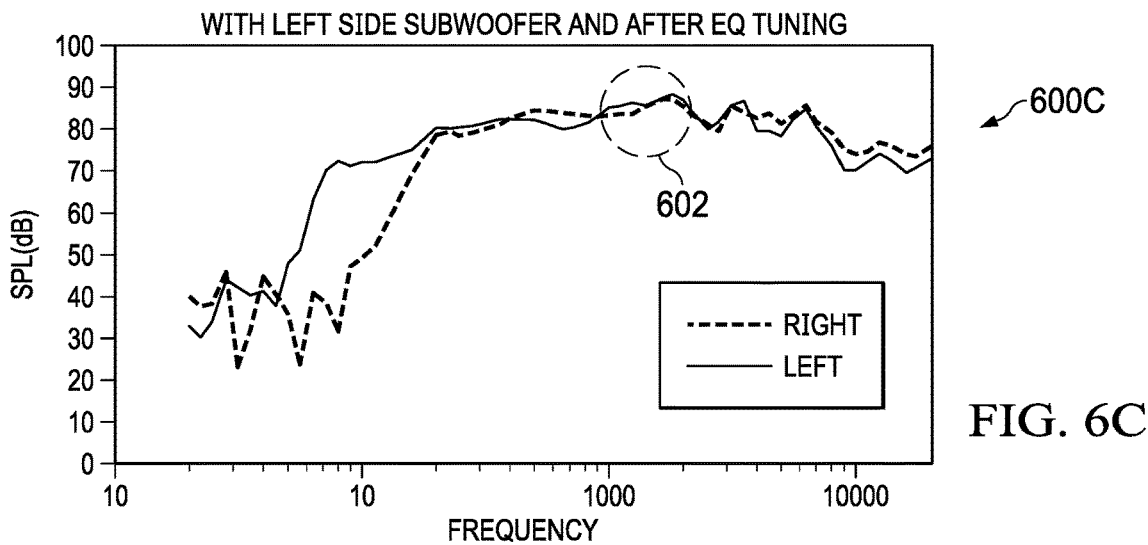

FIGS. 6A-C are graphs illustrating an example application of systems and methods for selecting crossover frequencies for 2.1 speaker systems integrated into electronic displays having a slim profile. Particularly, graph 600A in FIG. 6A shows a frequency response of an audio signal reproduced by speakers 102L-R, as received by a human user, in the absence of subwoofer 103.

Graph 600B in FIG. 6B shows a frequency response of the audio signal, as reproduced by speakers 102L-R and subwoofer 103, demonstrating an improved bass response in area 601 of the frequency spectrum, where the directionally of the reproduced sound is not noticeable or perceivable to the user (thus compensating for the off-center position of subwoofer 103). Finally, graph 600C shows a frequency response of the audio signal, as reproduced by speakers 102L-R and 103, with improved mid-range response in area 602 of the frequency spectrum, which may be achieved using an equalizer or the like.

In some cases, systems and methods described herein may select, modify and/or tune a 2.1 speaker system's crossover frequency to a value below 250 Hz, where a human ear is not capable of distinguishing the low bass audio's direction (as shown in FIG. 5), thereby addressing left/right audio channel volume mismatch and/or unbalancing when subwoofer 103 is operating. When systems and methods described herein are applied, a user only hears the stereo sounds as reproduced by speakers 102L-R sides, without being able to distinguish whether bass sounds are coming from the left or from the right sides, despite subwoofer 103 being unilaterally and/or asymmetrically positioned in a pseudo-2.1 (or non-symmetric) configuration.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An electronic display coupled to an IHS (Information Handling System), comprising:
   a left speaker coupled to a left side of an enclosure;
   a right speaker coupled to a right side of the enclosure; and
   a subwoofer coupled to the left or right side of the enclosure;
   wherein the left and right speakers are configured to reproduce components of an audio signal having frequencies above a crossover frequency, and wherein the subwoofer is configured to reproduce components of the audio signal having frequencies below the crossover frequency; and
   wherein the crossover frequency is selected by the IHS based, at least in part, upon a position of the subwoofer relative to at least a portion of the enclosure.

2. The electronic display of claim 1, wherein the portion of the enclosure is a horizontal center axis of the enclosure.

3. The electronic display of claim 2, wherein the crossover frequency is 200 Hz.

4. The electronic display of claim 2, wherein the crossover frequency is increased in response to the subwoofer being positioned farther from the horizontal center axis and decreased in response to the subwoofer being positioned closer to the horizontal center axis.

5. The electronic display of claim 2, wherein the crossover frequency is selected, at least in part, to produce a balanced stereo output to a user.

6. The electronic display of claim 5, wherein the crossover frequency is selected by the user.

7. The electronic display of claim 2, wherein the crossover frequency is selected, at least in part, to produce an omni-directional output from the subwoofer as perceivable by a human user.

8. The electronic display of claim 1, wherein the crossover frequency is selected, at least in part, based upon an application executed by the IHS coupled to the electronic display.

9. The electronic display of claim 1, wherein the crossover frequency is selected, at least in part, based upon context information collected by the IHS coupled to the electronic display.

10. The electronic display of claim 9, wherein the context information comprises a presence or absence of a user.

11. The electronic display of claim 9, wherein the context information comprises a proximity of a user with respect to at least one of the IHS or the electronic display.

12. The electronic display of claim 11, wherein the crossover frequency is increased in response to the user being farther from the at least one of the IHS or the electronic display and decreased in response to the user being closer to the at least one of the IHS or the electronic display.

13. An Information Handling System (IHS), comprising:
an enclosure;
a left speaker coupled to a left side of the enclosure, a right speaker coupled to a right side of the enclosure, and a subwoofer coupled to the left or right side of the enclosure, wherein the left and right speakers are configured to receive audio components consisting of frequencies above a crossover frequency and the subwoofer is configured to receive audio components consisting of frequencies below the crossover frequency;
a processor coupled to the enclosure; and
a memory coupled to the processor, the memory having program instructions stored thereon that, upon execution by the processor, cause the IHS to select the crossover frequency based, at least in part, upon a position of the subwoofer relative to at least a portion of the enclosure.

14. The memory storage device of claim 13, wherein the program instructions, upon execution, further cause the IHS to select the crossover frequency further based, at least in part, upon an application executed by the IHS.

15. The memory storage device of claim 13, wherein the program instructions, upon execution, further cause the IHS to select the crossover frequency further based, at least in part, upon context information.

16. The memory storage device of claim 15, wherein the context information comprises at least one of: a presence of a user, or a proximity of a user.

17. A method, comprising:
determining a position of an asymmetric subwoofer integrated into a display relative to at least a portion of the display, wherein the display is integrated in or coupled to an IHS (Information Handling System); and
selecting, by the IHS, a crossover frequency between the asymmetric subwoofer and a set of stereo speakers integrated into the display based, at least in part, upon the position of the asymmetric subwoofer.

18. The method of claim 17, wherein the selected crossover frequency produces an omni-directional output from the asymmetric subwoofer with respect to a human user.

19. The method of claim 17, wherein the portion of the display is a center of the display, and wherein the selected crossover frequency has a first value in response to the asymmetric subwoofer being positioned at a first distance from the center of the display, and a second value in response to the asymmetric subwoofer being positioned at a second distance from the center of the display.

* * * * *